(12) United States Patent
Demandolx

(10) Patent No.: US 8,280,185 B2
(45) Date of Patent: Oct. 2, 2012

(54) IMAGE DENOISING TECHNIQUES

(75) Inventor: Denis Demandolx, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1088 days.

(21) Appl. No.: 12/147,508

(22) Filed: Jun. 27, 2008

(65) Prior Publication Data

US 2009/0324117 A1 Dec. 31, 2009

(51) Int. Cl.
*G06K 9/40* (2006.01)
*G06K 9/36* (2006.01)
*H04N 11/02* (2006.01)
*H04N 11/04* (2006.01)

(52) U.S. Cl. ............... 382/275; 382/240; 375/240.1
(58) Field of Classification Search .................. None
See application file for complete search history.

(56) References Cited

U.S. PATENT DOCUMENTS

| | | | |
|---|---|---|---|
| 6,292,592 B1* | 9/2001 | Braunreiter et al. | 382/240 |
| 6,931,160 B2 | 8/2005 | Gindele et al. | |
| 6,937,772 B2 | 8/2005 | Gindele | |
| 6,990,252 B2 | 1/2006 | Shekter | |
| 7,054,474 B1 | 5/2006 | Krieger | |
| 7,068,851 B1 | 6/2006 | Berkner | |
| 7,206,455 B1 | 4/2007 | Hatipoglu | |
| 7,362,845 B2 | 4/2008 | Ning | |
| 2005/0008107 A1* | 1/2005 | Brown | 375/343 |
| 2005/0259889 A1 | 11/2005 | Ferrari et al. | |
| 2006/0165308 A1 | 7/2006 | Chakraborty | |
| 2006/0233257 A1* | 10/2006 | Keith et al. | 375/240.19 |
| 2007/0009176 A1* | 1/2007 | Lim et al. | 382/275 |
| 2007/0177817 A1 | 8/2007 | Szeliski et al. | |
| 2007/0223358 A1* | 9/2007 | Visoz et al. | 370/201 |
| 2010/0092082 A1* | 4/2010 | Hirakawa et al. | 382/167 |

OTHER PUBLICATIONS

Kivinen, et al., "Image Denoising with Nonparametric Hidden Markov Trees", IEEE International Conference on Image Processing, vol. 3, Sep. 16, 2007-Oct. 19, 2007, pp. 121-124.
Bala, et al., "A Multivariate Thresholding Technique for Image Denoising Using Multiwavelets", EURASIP Journal on Applied Signal Processing, vol. 2005, Issue 1 (Jan. 2005), pp. 1205-1211.
Chaux, et al., "A Nonlinear Stein Based Estimator for Multichannel Image Denoising", IEEE Transactions on Signal Processing, 2008, vol. 56, Issue 8, pp. 1-30.
Buades, et al., "A non-local algorithm for image denoising", IEEE Computer Society Conference on Computer Vision and Pattern Recognition, 2005, vol. 2, Jun. 20-25, 2005, pp. 60-65.
Buades, et al., "The Staircasing Effect in Neighborhood Filters and its Solution", IEEE Transactions on Image Processing, vol. 15, No. 6, Jun. 2006, pp. 1499-1505.
Chang, et al., "Spatially Adaptive Wavelet Thresholding with Context Modeling for Image Denoising", IEEE Transactions on Image Processing, vol. 9, No. 9, Sep. 2000, pp. 1522-1531.
Choudhury, et al., "The Trilateral Filter for High Contrast Images and Meshes", Eurographics Symposium on Rendering, 2003, 12 pages.
Cho, et al., "Multivariate Statistical Approach for Image Denoising", IEEE International Conference on Acoustics, Speech, and Signal Processing, Mar. 18-23, 2005, vol. 4, pp. iv/589-iv/592.

(Continued)

*Primary Examiner* — Randolph I Chu

(57) ABSTRACT

Image denoising techniques include determining wavelet-domain noise model and a non-parametric multivariate wavelet description from the image signal for raw image data. A noise corrected image may then be determined from the image signal, the wavelet-domain noise model and the non-parametric, multivariate wavelet description and the image signal.

12 Claims, 8 Drawing Sheets

OTHER PUBLICATIONS

Coifman, et al., "Translation-Invariant De-Noising", Springer-Verlag, 1995, pp. 125-150.

Donoho, et al., "Ideal Spatial Adaptation by Wavelet Shrinkage", Biometrika, 1994, vol. 81, 30 pages.

David L. Donoho, "De-Noising by Soft-Thresholding", IEEE Transactions on Information Theory, vol. 41, Issue 3, May 1995, pp. 613-627.

Donoho, et al., "Minimax Estimation via Wavelet Shrinkage", Ann. Statist, vol. 26, 1998, 41 pages.

Liu, et al., "Automatic Estimation and Removal of Noise from a Single Image", IEEE Transactions on Pattern Analysis and Machine Intelligence, vol. 30, Issue 2, Feb. 2008, pp. 299-314.

Malvar, et al., "High-Quality Linear Interpolation for Demosaicing of Bayer-Patterned Color Images", IEEE International Conference on Acoustics, Speech, and Signal Processing, vol. 3, May 17-21, 2004, pp. 485-488.

Stephane G. Mallat, "A Theory for Multiresolution Signal Decomposition: The Wavelet Representation", IEEE Transactions on Pattern Analysis and Machine Intelligence, vol. 11, Issue 7, Jul. 1989, pp. 674-693.

Mihcak, et al., "Spatially Adaptive Statistical Modeling of Wavelet Image Coefficients and its Application to Denoising", IEEE International Conference on Acoustics, Speech, and Signal Processing, vol. 06, 1999, pp. 3253-3256.

Moulin, et al., "Analysis of Multiresolution Image Denoising Schemes Using Generalized Gaussian and Complexity Priors", IEEE Transactions on Information Theory, vol. 45, Issue 3, Apr. 1999, pp. 909-919.

Perona, et al., "Scale Space and Edge Detection using Anisotropic Diffusion", IEEE Transactions on Pattern Analysis and Machine Intelligence, vol. 12, Issue 7, Jul. 1990, pp. 629-639.

Portilla, et al., "Image Denoising using Scale Mixtures of Gaussians in the Wavelet Domain", IEEE Transactions on Image Processing, vol. 12, No. 11, Nov. 2003, pp. 1-13.

Rudin, et al., "Nonlinear Total Variation Based Noise Removal Algorithms", Physica D 60, 1992, pp. 259-268.

Simoncelli, et al., "Noise Removal via Bayesian Wavelet Coring", Proceedings of 3rd IEEE International Conference on Image Processing, vol. I, Lausanne, Switzerland, Sep. 16-19, 1996, pp. 379-382.

Eero P. Simoncelli, "Bayesian Denoising of Visual Images in the Wavelet Domain", Bayesian Inference in Wavelet Based Models, eds. P Muller and B Vidakovic, Chapter 18, Lecture Notes in Statistics, vol. 141, Springer-Verlag, New York, 1999, pp. 1-20.

Tomasi, et al., "Bilateral Filtering for Gray and Color Images", Sixth International Conference on Computer Vision, 1998, Bombay, India, Jan. 4-7, 1998, pp. 839-846.

Zhang, et al., "Image Denoising via Wavelet-Domain Spatially Adaptive FIR Wiener Filtering", IEEE International Conference on Acoustics, Speech, and Signal Processing, 2000, vol. 6, pp. 2179-2182.

* cited by examiner

IMAGE DENOISING TECHNIQUES

BACKGROUND

Computing devices have made significant contributions toward the advancement of modern society and are utilized in a number of applications to achieve advantageous results. Numerous devices, such as digital cameras, computers, game consoles, video equipment, hand-held computing devices, audio devices, telephones, and navigation systems have facilitated increased productivity and reduced costs in communicating and analyzing data in most areas of entertainment, education, business and science. The digital camera and camcorders, for example, have become popular for personal use and for use in business.

FIG. 1 shows an exemplary digital camera. The digital camera 100 typically includes one or more lenses 110, one or more filters 120, one or more image sensor arrays 130, an analog-to-digital converter (ADC) 140, a digital signal processor (DSP) 150 and one or more computing device readable media 160. The image sensor 130 includes a two-dimension array of hundreds, thousand, millions or more of imaging pixels, which each convert light (e.g. photons) into electrons. The image sensor 130 may be a charge coupled device (CCD), complementary metal oxide semiconductor (CMOS) device, or the like. The filter 120 may be a Bayer filter that generates a mosaic of monochrome pixels. The mosaic of monochrome pixels are typically arranged in a pattern of red, green and blue pixels.

In an exemplary implementation, the digital camera 100 may include a lens 110 to focus light to pass through the Bayer filter 120 and onto the image sensor 130. The photons passing through each monochrome pixel of the Bayer filter 120 are sensed by a corresponding pixel sensor in the image sensor 130. The analog-to-digital converter (ADC) 140 converts the intensity of photons sensed by the pixel sensor array into corresponding digital pixel data. The raw pixel data is processed by the DSP 150 using a demosaic algorithm to produce final interpolated pixel data. The final interpolated pixel data is typically stored in one or more of the computing device readable media 160. One or more of the computing device readable media 160 may also store the raw pixel data.

Image denoising is an important part of image enhancement of digital and analog image acquisition systems. Image denoising has been a widely studied problem in image processing. Among the techniques, wavelet domain denoising has received considerable interest. Wavelets are a theory and algorithms to achieve a linear space-frequency decomposition of a signal. Referring now to FIGS. 2A and 2B an exemplary image and corresponding wavelet transform is shown. Wavelets permit the representation of a signal as a sum of dyadically scaled and translated copies of a "mother" wavelet. For each resolution (e.g., scale), starting from the highest to the coarsest, the signal is iteratively decomposed into a low-pass sub-band and several high-pass residual sub-bands (one for each orientation) resulting in a multi-scale sub-band decomposition of the signal, as illustrated in FIG. 2B. High-pass coefficients encode the missing information to be able to reconstruct the high resolution signal in each orientation from the low-pass version. Conventional wavelet denoising techniques include wavelet hard and soft thresholding and multivariate or spatially adaptive extension.

Noise herein refers to random degradation present in images as opposed to deterministic or nearly deterministic distortions such as optical aberrations. The main sources of noise in digital based image acquisition systems (e.g., charge coupled devices (CCD), complementary metal oxide semiconductor (CMOS) and the like) include, but are not limited to photon noise, dark current noise, readout noise and fixed-pattern noise. Photon noise (e.g., shot noise) refers to the inherent natural variation in the process of counting the photon in the incident light flux. The number of photon arrivals during a given recording period is governed by Poisson statistics whose variance is equal to the average total number of photons. Dark noise (e.g., thermal noise) comes from the detection of thermally generated electrons within the sensor (e.g., CCD material). Dark current describes the rate of the generation of thermal electrons at a given sensor temperature. Readout noise refers to the uncertainty introduced during the process of quantifying the electronic signal on the chip. The major component of readout noise comes from the on-chip preamplifier. Some authors make the distinction between on-chip electronic noise and amplifier noise but readout noise is most often defined as the sum of all camera-characteristics signal-independent noises. Fixed pattern noise (FPN) is due to differences in individual sensor cell (e.g., pixel) sensitivity. This type of noise is more visible at higher intensities and is signal-dependent. It statistics are proportional to the original signal.

Image restoration is typically based on the modeling of both the expected image signal and the degradation such as the contaminating noise. Removal of noise from images relies on differences in the statistical properties of noise and expected signal as the artifacts arising from many imaging devices is quite different from the image that the noise contaminates. Using models describing signal and noise statistics, various estimation techniques are used to reduce the noise in the observed image signal. However, due to the high dimensionality (e.g., long range) in spatial correlations of natural images, modeling the statistics of these images is complex. In particular, there is a high, long-range dependency between pixels in the same neighborhood. For example, pixels belonging to the same texture are correlated and the range of this correlation can go well beyond the short range of a few pixels in regular images. To address the issue, a few assumptions are commonly made to simplify the signal models.

A first assumption is the stationarity also referred to as translation-invariance in image processing. In translation invariance the statistical distribution of pixels in a given neighborhood is the same for all locations within the image. A second assumption is that the autocorrelation between any pair of neighboring pixels is rapidly decaying with the distance between the pixels. A third common assumption is that the statistical distribution of pixels in a neighborhood (signal, noise or both) follows univariate or multivariate Gaussian statistics. These assumptions are not all suitable for natural images that commonly contain a variety of large correlated structures.

For an image contaminated by additive white Gaussian noise (AWGN) the image can be expressed by:

$$y = x + n \quad (1)$$

Where y is the noisy observation, x the noise-free signal to be estimated and n the AWGN. If the noise is AWGN in the spatial (e.g., regular) domain, the noise is AWGN in the wavelet domain too because the wavelet transform is linear and orthogonal. For multivariate probability distributions: $P(A|B)$ is the conditional probability of event A given B; $P(A, B)$ is the joint probability of having both events A and B together; and $P(A)$ is the marginal probability of event A regardless of B.

In the context of the minimum mean square error (MMSE) estimation, the mean of the posterior distribution provides an unbiased estimate of the variable x, given measurement y. MMSE takes a weighted average:

$$x'(y) = P_{x|y}(x|y) \times dx \quad (2)$$

Applying Bayes' formula, $P_{x|y}(x|y)P_y(y)=P_{x,y}(x,y)=P_{x|y}(x|y)P_x(x)$ the probability densities of the noise and signal:

$$x'(y) = \int_x P_{y|x}(y|x) P_x(x) \times dx / P_y(y) \quad (3)$$

and $$P_y(y) = \int x P_{y|x}(y|x) P_x(x) dx \quad (4)$$

$P_{y|x}$ is actually the probability density of the noise, which can be rewritten as $P_n(n)=Pn(y-x)$ and Px is the prior probability density of the signal, which gives:

$$x'(y) = \int_x P_n(y-x) P_x(x) \times dx / \int_x P_n(y-x) P_x(x) dx \quad (5)$$

The denominator is the probability density function (PDF) of the noisy observation—convolution of the noise and the signal's PDFs.

In one technique, a univariate generalized Gaussian distribution (GGD) model, which closely fits the distribution of wavelet coefficients in natural images, has been extended with a multivariate (GGD). The technique estimates the MGGD core parameters using a set of "training images." The signal covariance matrix is estimated from the noisy observation under the additive white Gaussian noise (AWGN) assumption. The model is used to resolve a Bayesian maximum posteriori (MAP) estimation equation. The technique takes approximately 15-45 second for each channel of a 512× 512 image with A Daubechies 8 wavelet filter on a Pentium IV type personal computer.

In another technique, a multivariate model for discrete wavelet transform (DWT) coefficient neighborhood using scale mixtures of Gaussian distribution is developed. With this model and under the additive Gaussian noise of know covariance assumption, a Bayesian least squares estimated is constructed. This Gaussian scale mixture (GSM) model can represent the leptokurtotic behavior of the wavelet coefficient distributions, as well as the dependence of their local amplitudes. The mixture of Gaussian leads to mathematically more tractable solutions than the MGGD. The technique takes about 20-60 second for each channel of a 256×256 image on a Pentium III type personal computer.

The conventional techniques are computationally intensive. The conventional techniques may also cause blurring, smoothing or the like of the image particular around edges, lines and texture areas or the like. Accordingly, what is needed is a computationally less expensive noise correction technique. What is also needed is a denoising technique providing an improved noise correction quality.

SUMMARY

Embodiments of the present technology are directed toward image denoising techniques. In one embodiment, an image denoising method includes determining a wavelet domain noise model and a non-parametric multivariate wavelet-domain description of a signal probability density for image data. A noise corrected image is determined from the image data, image signal, wavelet-domain noise model and the non-parametric multivariate wavelet-domain description of the signal probability density function, and a Bayesian multivariate minimum mean square error (MMSE) estimation formula.

In another embodiment, an image denoising system includes a noise analyzer and a noise correction engine. The noise analyzer receives image data and generates a wavelet domain noise model and a non-parametric, multivariate wavelet-description of the image. The noise correction engine receives the image data, the wavelet domain noise model and the non-parametric, multivariate wavelet-description of the image and generates a noise corrected image.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
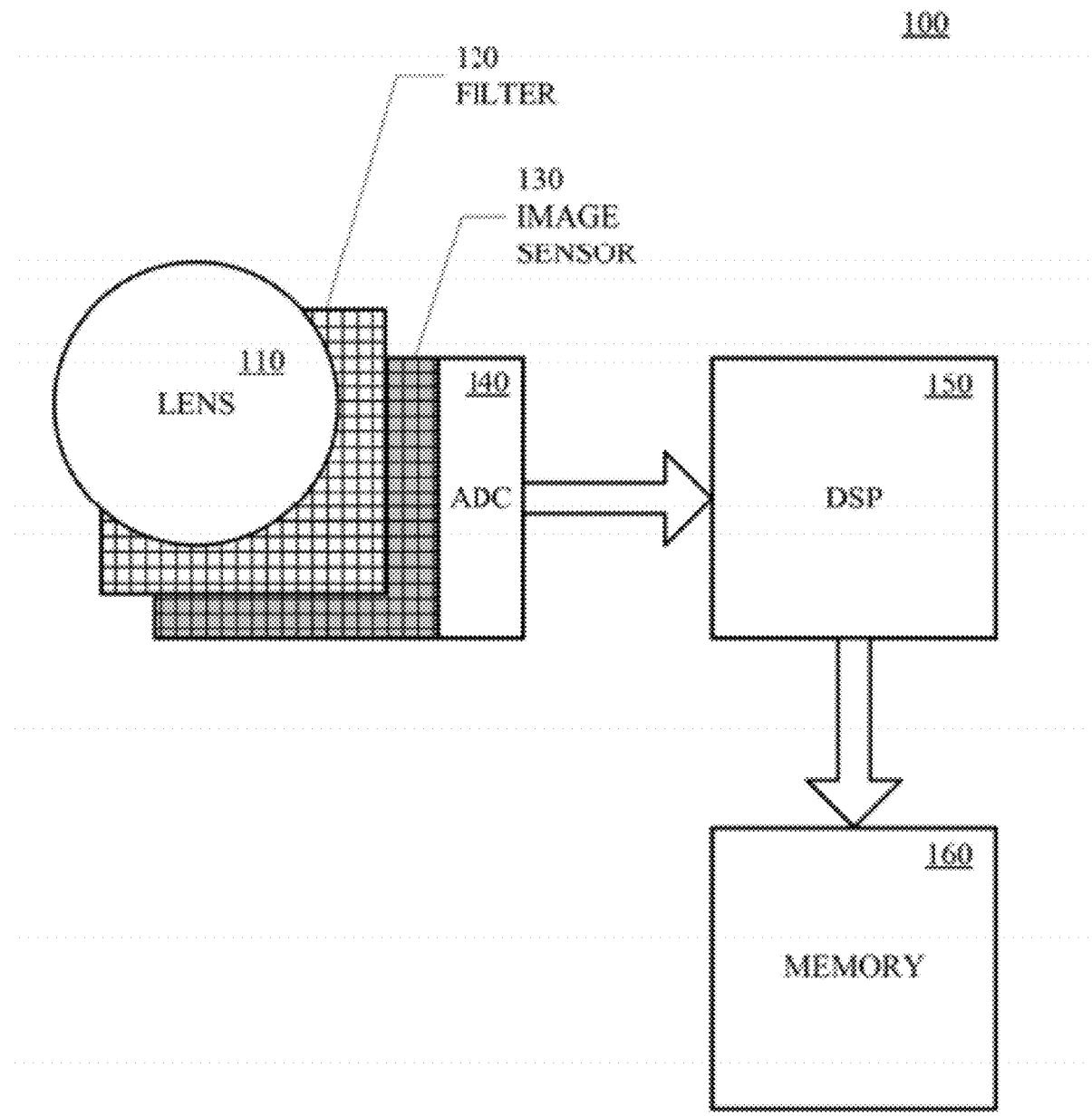
FIG. 1 shows a block diagram of an exemplary digital camera.
Figure 2A:
FIGS. 2A and 2B show an exemplary image and corresponding wavelet transform.
Figure 2B:
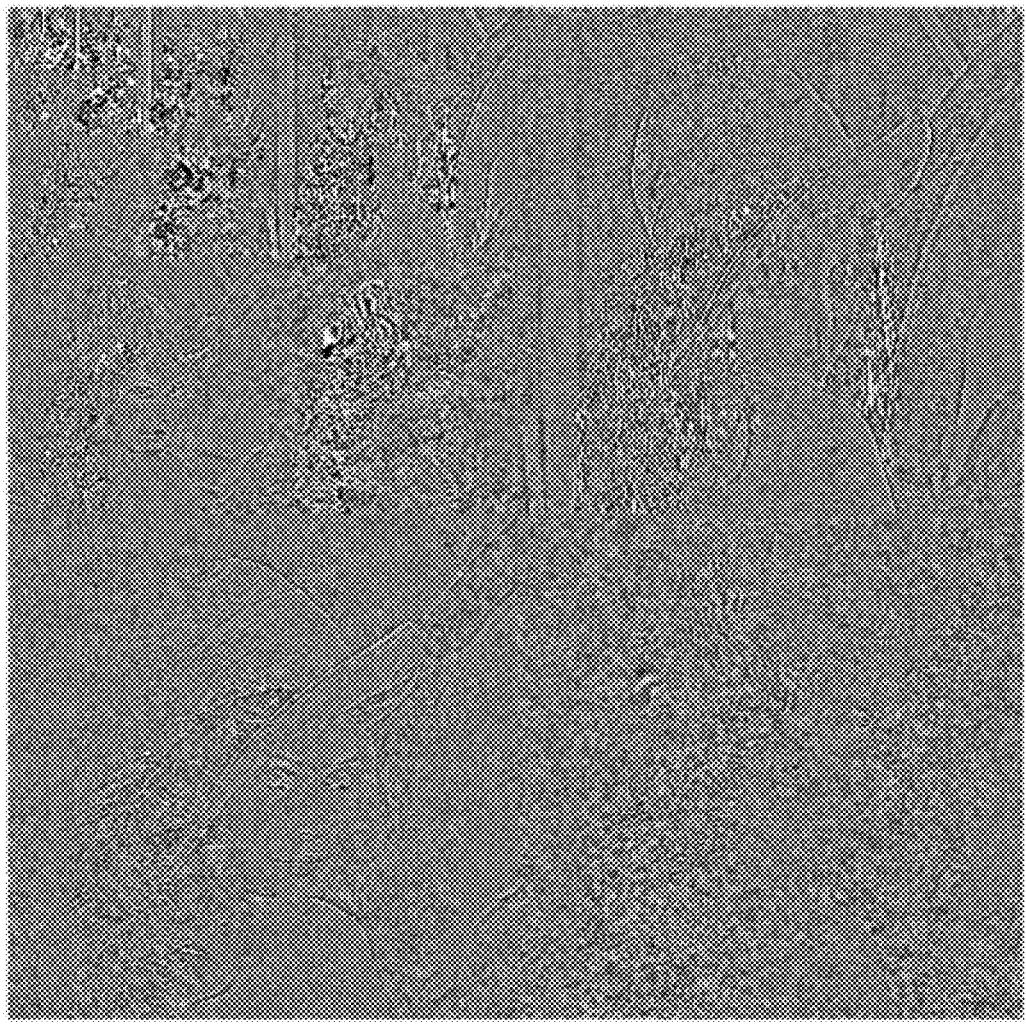
Figure 3:
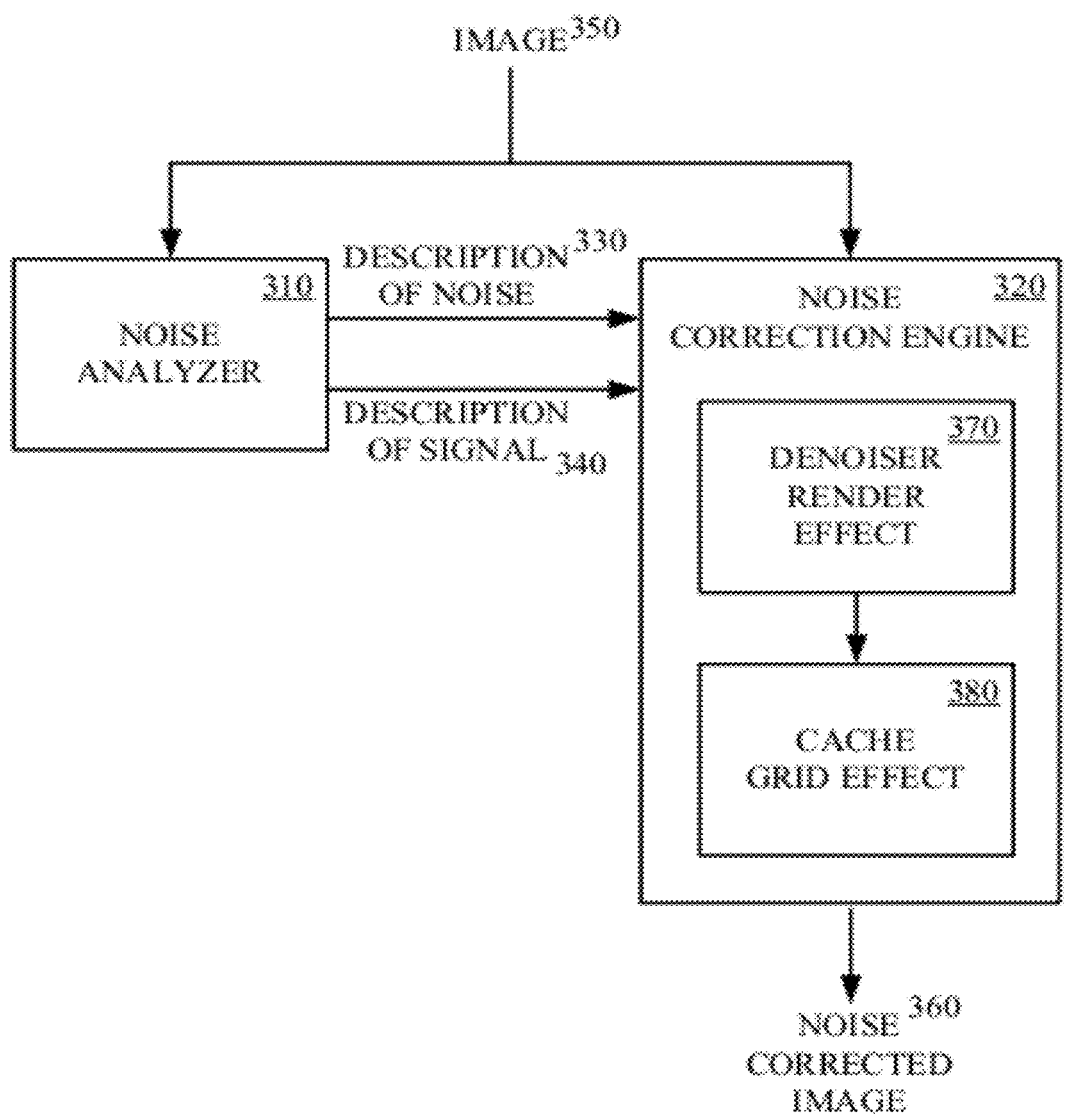
FIG. 3 shows a block diagram of a multivariate, non-parametric, wavelet-domain image denoising system, in accordance with one embodiment of the present technology.

Referring to FIG. 3, a multivariate, non-parametric, wavelet-domain image denoising system, in accordance with one embodiment of the present technology, is shown. The system includes a noise analyzer 310 and a noise correction engine 320. The noise analyzer 310 determines a description of the noise 330 and a description of a signal 340 from image data. In one implementation, the image is analyzed to produce noise and signal descriptions (e.g., NoiseWaveletModel and SignalStatistics objects) 330, 340. The noise correction engine 320 uses the description of the noise 330 and the description of the signal 340 to generate a noise corrected image 360 from the image data 350.

The noise correction engine 320 may include a denoiser render effect 370 and cache grid effect 380. The cache grid effect 380 is similar to regular cache effect that holds tiles in memory so that they do not have to be recomputed all the time for every request. But in the cache grid effect 380, cached tiles are aligned on a specified grid (e.g., 512×512 grid). The cache grid effect 380 takes care of converting random tile requests to nicely-aligned tiles. That means that there are no overlapping tiles in cache and the cache grid effect 380 code is limited to stitching grid aligned tiles to fulfill specific requested area of the image system (e.g., no complicated missing region calculation). In the denoising framework, the cache grid effect 380 also ensures that the denoiser render effect 370 will be called in a consistent manner with the same tile locations and size.

The denoiser render effect 370 actually performs wavelet-domain filtering. For each requested tile (typically 512×512), the denoiser render effect 370 inflates the area and asks its input for a larger support. This is to be able to perform the denoising for several translation shifts as well as to avoid tile junction artifacts. The procedure includes converting the image to YIQ if the analyses have been performed in the YIQ domain. The benefit of using YIQ is that it is a simple matrix transformation of the RGB channels and that the denoiser is able to accentuate the denoising on the IQ chromaticities taking advantage of the fact that the human eye is much less sensitive to slight loss of details in these channels that it is for the luminance. Nevertheless it is possible to apply denoising directly to the RGB channel. The procedure also includes getting the noise and signal models from the noise analyzer 310. At this point, it is also known if the image is monochrome or not. For each cycle-spinning shift (one in low quality, two in normal quality and four in high quality) and for each channel (one if the image is monochrome): 1) the buffer is scrolled (e.g., cycle-spin); 2) the forward discrete wavelet transform is applied to decompose the image into wavelet sub-bands; 3) each sub-band of the wavelet transform (e.g., four levels) is denoised; the discrete wavelet transform is inverted to go back to the spatial domain; and 4) the result is inverse scrolled and accumulated in the final output buffer. During denoising, a MMSE estimation formula is applied using the signal and noise models provided by the noise analyzer 310 for each pixel of each sub-band. Thereafter, the denoised tile is converted back to RGB and handed off to the next effect in the image processing pipeline. The cache grid effect 380 caches the image buffer generated by the denoiser render effect 370 for consumption in the next effect in the image processing pipeline.

In another implementation, the noise reduction is applied on the raw image in the Bayer sensor domain before demosaicing.

In one implementation, the discrete wavelet transform is based on the Cohen-Daubechies-Feauveau (2,2) wavelet base. The DWT software code uses a "lifting scheme" algorithm and permits modifying the wavelet basis if needed. Alternatively the denoiser render effect 370 performs scrolling, DWT, denoising, inverse DWT, unscrolling and accumulation and is performed on a graphics processing unit (GPU). The GPU based DWT does not use the lifting algorithm. Instead, regular convolution-based DWT is performed on the GPU.

Figure 4:
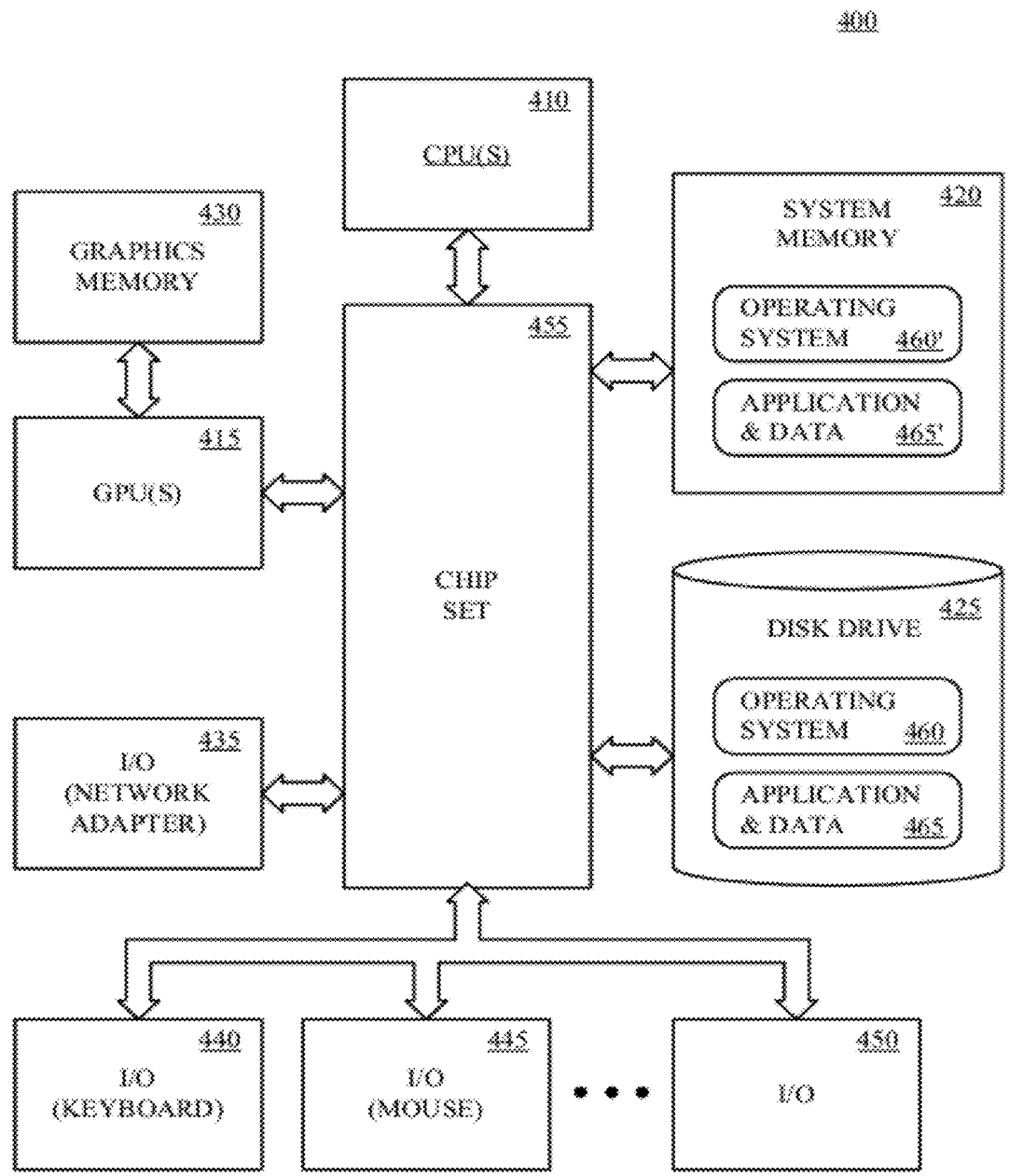
FIG. 4 shows a block diagram of an exemplary computing device for implementing the multivariate, non-parametric wavelet-domain image denoising system, in accordance with one embodiment of the present technology.

The Bayesian multivariate, non-parametric wavelet-domain image denoising system may be implemented in hardware or software on a general purpose processor (CPU), a graphics processor (GPU), digital signal processor (DSP) or the like. For example, a computing device for implementing the multivariate, non-parametric wavelet-domain image denoising system is shown in FIG. 4. The computing device includes one or more processors (e.g., CPU, GPU) 410, 415, one or more computing device-readable media 420-430 and one or more input/output (I/O) devices 435-450. The processors 410, 415, computing device-readable media 420-430 and I/O device 435-450 are typically communicatively coupled to each other by a chip set 455 and/or one or more busses. The chipset 455 acts as a simple input/output hub for communicating data and instructions between the processors 410, 415, the computing device-readable media 420-430, and the I/O devices 435-450.

The I/O devices 435-450 may include a network adapter (e.g., Ethernet card) 435 for communicating with one or more server computers over one or more networks. The I/O devices 435-450 also may include a CD drive, DVD drive and/or the like, and peripherals such as a keyboard 440, a pointing device 445, a speaker, a printer, a monitor and/or the like.

The computing device-readable media 420-430 may be characterized as primary memory and secondary memory. Generally, the secondary memory, such as a magnetic and/or optical storage, provides for non-volatile storage of computer-readable instructions and data for use by the computing device 400. For instance, the disk drive 425 may store the operating system (OS) 460, and applications and data 465. The primary memory, such as the system memory 420 and/or graphics memory 430, provides for volatile storage of computer-readable instructions and data for use by the computing device 400. For instance, the system memory 420 may temporarily store a portion of the operating system 360', and a portion of one or more applications and associated data 465' that are currently used by the CPU 410, GPU 415 and the like. An application and data 465, 465' implement the techniques to denoise image data described herein.

Figure 5:
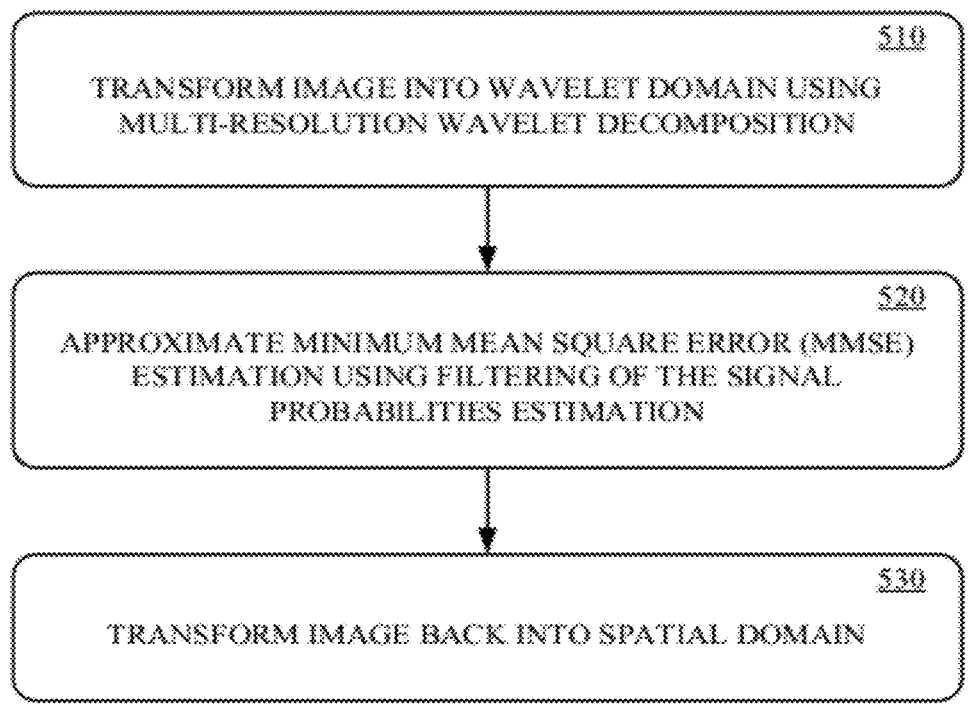
FIG. 5 shows a flow diagram of a method of denoising an image, in accordance with one embodiment of the present technology.
Figure 6:
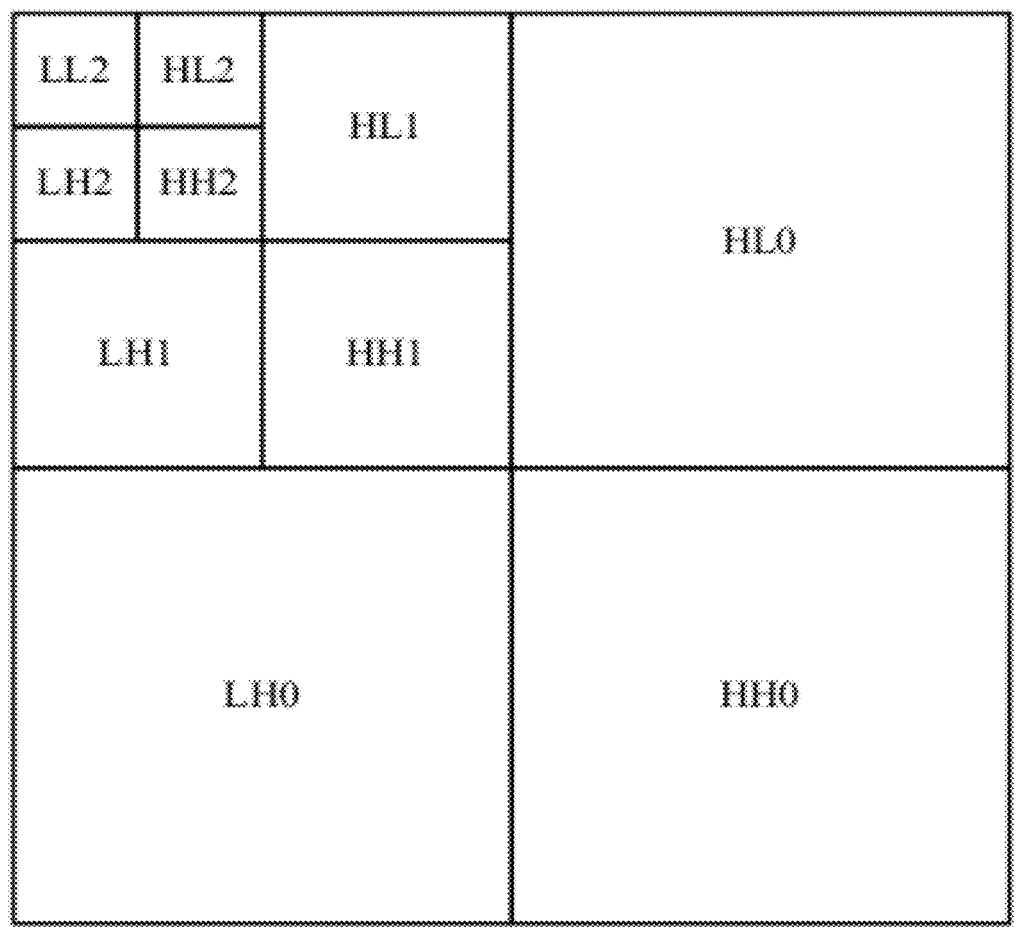
FIG. 6 shows a block diagram illustrating sub-bands of a multi-level wavelet transform, in accordance with one embodiment of the present technology.

Operation of the multivariate, non-parametric, wavelet-domain image denoising system will be further explained with reference to FIG. 5. The multivariate, non-parametric, wavelet-domain image denoising process begins with transforming (e.g., decomposing) an image into the wavelet domain, at 510. A discrete wavelet transform (DWT) may be used to transform image data into the wavelet domain (e.g., multi-resolution wavelet decomposition). The coefficients are grouped in sub-bands of different scales and orientations are illustrated in FIG. 6. For instance $LH_k$ refers to the coefficients at the $k^{th}$ scale of the decomposition which are the output of the wavelet low-pass filter in the horizontal direction and of the high pass filter in the vertical direction of the input sub-band $LL_{k-1}$. In the $k^{th}$ step of the decomposition, $LL_k$, $HL_k$, $LH_k$, and $HH_k$ are substituted to $LL_{k-1}$. That is why only the last low-resolution residual $LL_{n-1}$ appears in the decomposition. Scale k=0 indicates the first level of the decomposition (e.g., highest resolution) whereas k=n−1 is the largest (e.g., coarsest) scale where n is the total number of decompositions levels. The sub-band LL is the low resolution residual and all the other sub-bands encode the details for each scale and orientation.

If the noise is AWGN in the spatial (e.g., regular) domain, the noise is AWGN in the wavelet domain too because the wavelet transform is linear and orthogonal. Due to the linearity of the wavelet transform, the additive noise assumption in the spatial domain is maintained although some noise properties may have been modified during the low-pass filtering performed at each level of the multi-resolution decomposition. If the noise is assumed to be white (e.g., independent) noise, the wavelet-domain noise can be assumed to be white also, because an orthonormal or biorthogonal DWT was used. Typically, if the noise in the spatial domain is assumed to be additive Gaussian white noise (AGWN), noise in the wavelet domain will be additive Gaussian white noise (AGWN) but with a specific variance for each sub-band. For each sub-band:

$$y = x + n \qquad (1)$$

where y is the noisy input, x the noise-free signal to be estimated and n the additive noise, which are now defined in the wavelet domain.

At 520, the minimum mean square error (MMSE) estimation is approximated using filter of the signal probabilities estimation. In one implementation, the filtering may be Gaussian. The multivariate minimum mean square error is estimated. Generally, the mean square error may be estimated:

$$x'(y) = \int_x P_n(y-x)P_x(x) \times dx / \int_x P_n(y-x)P_x(x)dx \qquad (5)$$

Figure 7:
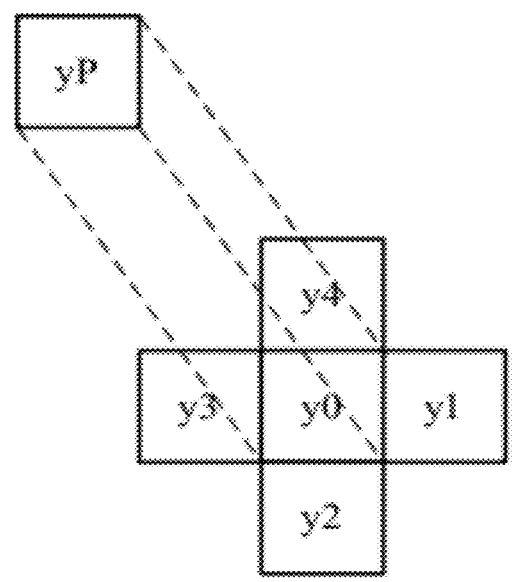
FIG. 7 shows a block diagram illustrating a nearest-neighbor region of a wavelet transform, in accordance with one embodiment of the present technology.

The mean square error equation may be reinterpreted in the multivariate context. In general, the neighborhood may include coefficients from nearby spatial locations, nearby orientations, or nearby scales in the same or nearby sub-bands. To take advantage of the statistical dependency between neighboring pixels as well as the higher level representation of the image at the next coarser sub-band, a four-nearest-neighbor region surrounding the reference coefficient in the same sub-band may be chosen, together with the coefficient at the same location and orientation at the next coarser scale (e.g., parent) as illustrated in FIG. 7. The four-nearest neighbor turns out to be a good trade-off between model simplicity and denoising performance. Tests have shown that the inclusion of the parent coefficient and the four-nearest-neighbors improve the denoising performance significantly when applied separately or together. The technique uses the four nearest spatial neighbors for the coarsest scale sub-bands that have no parent. Similarly, the spatial neighborhood regions near edges and corners are cut.

For the multivariate minimum mean square error, let X be the vector representing the neighborhood of coefficients clustered around the coefficient under consideration x. Let D note the size of the neighborhood. Accordingly, D=6 if the reference pixel $x_0$ its four nearest neighbors ($x_1$, $x_2$, $x_3$ and $x_4$) and its parent $x_p$ are taken. Let X be a D-dimensional wavelet coefficient vector, $X = \{x_0, x_1, x_2, x_3, x_4, x_p\}$. Similarly, the corresponding vector for the noisy observation Y is denoted as $Y = \{y_0, y_1, y_2, y_3, y_4, y_p\}$. It is to be appreciated that the signal coefficient vector X and the noise coefficient vector Y can be extended to smaller or larger neighborhoods, such as using the wavelet decomposition of other channels (e.g., G and B if denoising R). In the present multivariate case, the minimum mean square error estimation equation becomes:

$$X'(Y) = \int_X \mathbf{\Omega} P_n(Y-X)P_X(X) \times dX / \int_X \mathbf{\Omega} P_n(Y-X)P_X(X)dX \qquad (6)$$

where $\Omega$ is the D-dimensional real space and $dX = dx_0, dx_1, dx_2, dx_3, dx_4, dx_p$. With the six-dimensional neighborhood model, the multivariate minimum MMSE estimation of equation (6) is computationally expensive. To reduce the computational expense, an approximate MMSE estimation procedure is used to restore the noisy wavelet image coefficients. The signal PDF may be approximated using each of its 2-D marginal projections:

$$P_X \text{ or } Y(X) = P_{(x_0,x_1,x_2,x_3,x_4,x_p)} \sim P(x_0, x_1) \qquad (4)$$

$$P(x_0, x_2)P(x_0, x_3)P(x_0, x_4)P(x_0, x_p)/(P(x_0))^4$$

Reduced to 2-D, the signal PDFs will concentrate more statistics per bucket and will be smoother.

However, in view of automatic classification methods, a simple small Gaussian filer makes the distribution even smoother. Assuming that the noise is white (e.g., independent):

$$Pn(Y-X) = Pn(y_0-x_0, y_i-x_i, \ldots, y_p-x_p) \sim Pn(y_0-x_0)Pn(y_i-x_i) \ldots Pn(y_p-x_p) \qquad (8)$$

then the numerator in equation (6) can be rewritten as follows:

$$\text{Num} = \int x_0 \int x_1 \ldots \int x_p Pn(y_0-x_0)Pn(y_i-x_i) \ldots Pn(y_p-x_p)Px(x_0,x_1) \ldots Px(x_0,x_p)/(Px(x_0))^4 \times dX \qquad (9)$$

Considering the first scalar element of X:

$$= \int x_0 \int x_1 \ldots \int x_p Pn(y_0-x_0) \ldots Pn(y_p-x_p)Px(x_0, x_1) \qquad (10)$$

$$\ldots Px(x_0, x_p)/(Px(x_0))^4 dx_0 dx_1 \ldots dx_p$$

$$= \int x_0 Pn(y_0-x_0)/(Px(x_0))^4 x_0 \int x_1 Pn(y_i-x_i)Px(x_0, x_1)$$

$$\ldots \int x_p Pn(y_p-x_p)Px(x_0, x_p)dx_p \ldots dx_1 dx_0$$

Since the observation PDF (Py) is convoluted with the noise, the approximation between Px and Py can be made:

$$Py(x_0, y_p) \sim \int x_p P_n(y_p-x_p)Px(x_0-x_p)dx_p \qquad (11)$$

The Py distribution does not need further smoothing in the x0 direction as the noise did it already. Doing the same substitution for other neighbors reduces equation (10) to:

$$\text{Num} = \int_{x_0} x_0 Pn(y_0-x_0)Py(x_0, y_1)Py(x_0, y_2)Py(x_0, y_3)Py(x_0, y_4)Py(x_0, y_p)/(Px(x_0))^4 dx_0 \qquad (12)$$

Likewise for the denominator $$\text{Den} = \int x_0 Pn(y_0-x_0)Py(x_0, y_1)Py(x_0, y_2)Py(x_0, y_3)Py(x_0, y_4)Py(x_0, y_p)/(Px(x_0))^4 dx_0 \qquad (13)$$

In one implementation, if Px(x0) is approximated from Py(x0), calculation of the coefficient estimate is a 1-D convolution. Alternatively, $Px(x_0)$ could be estimated from $Py(x_0)$ assuming a GGD for Px and an independent identically distributed (i.i.d.) Gaussian noise of known variance for Pn.

$$X_0'(Y) = \text{Num}/\text{Den} \qquad (14)$$

Recalling the approximation made in equation (7), one can write:

$$\text{Num} = \int_{x_0} x_0 Pn(y_0-x_0)Py(x_0, y_1, y_2, y_3, y_4, y_p)dx_0$$

$$\text{Den} = \int_{x_0} Pn(y_0-x_0)Py(\{x_0, y_1, y_2, y_3, y_4, y_p\})dx_0 \qquad (15)$$

Which is equivalent to averaging all similar neighbors that are actually identical for $y_1$, $y_2$, $y_3$, $y_4$, $y_p$ neighbors and similar for $x_0$. This is intuitively sensible since estimation of the reference pixel $x_0$ is desired. However, with such a drastic similarity constraint, one would not find enough neighbors to get a meaningful average. In other words, the 6-dimensional observed (non-parametric) Py would be null almost everywhere, but with the approximation of equation (7), "2-D" Py projections concentrate more points (e.g., the point distributions are much denser) and are much less frequently null. As already mentioned earlier, a small Gaussian filter is applied in the non-x0 directions to make the distribution even more complete and smooth.

To be able to resolve the estimator equation (7) above, the signal statistics $Py(y_0,y_1)$, $Py(y_0,y_2)$, $Py(y_0,y_3)$, $Py(y_0,y_4)$, $Py(y_0,y_p)$, and $Py(y_0)$ are measured for each wavelet sub-band. The noise statistics $Pn(y_0-x_0)$ also needs to be estimated for each sub-band. For the later, a Gaussian distribution is assumed and the variance for each sub-band will be estimated.

The 2-D histograms Py for the wavelet sub-bands are recorded, for which there are multiple symmetries. The intuition is that the statistics of the image signal should not change if the signal is translated, exchanged with its mirror image, inverted, or rotated ±90 degrees. All these assumptions can be verified experimentally.

Translation gives:

$$Py(x_0,x_1) \sim Py(x_3,x_0) \quad (16)$$

$$Py(x_0,x_2) \sim Py(x_4,x_0) \quad (17)$$

Symmetry gives:

$$Py(x_0,x_1) \sim Py(x_1,x_0) \quad (18)$$

$$Py(x_0,x_2) \sim Py(x_2,x_0) \quad (19)$$

etc.
Inversion gives:

$$Py(x_0,x_1) \sim Py(-x_0,-x_1) \sim Py(-x_1,-x_0) \quad (20)$$

etc.

In addition, the high-frequency distribution $Py(x_0, x_1)$ in the $HL_k$ sub-band can be expected to be similar to the high-frequency distribution $Py(x_0, x_2)$ in the $LH_k$ sub-band rotated ±90 degrees. Likewise, the low-frequency distribution $Py(x_0, x_2)$ in the $HL_k$ sub-band is similar to the low-frequency distribution $Py(x_0, x_1)$ in the $LH_k$ sub-band. Finally, in the $HH_k$ sub-band, the high frequency distributions $Py(x_0, x_1)$ and $Py(x_0, x_2)$ are similar.

As a result of the symmetries, only five original 2-D distributions per wavelet decomposition level k remain: 1) high-frequency 2-D Py in $HL_k$ or $LH_k$ sub-bands; low-frequency 2-D Py in $HL_k$ or $LH_k$ sub-bands; high frequency 2-D Py in $HH_k$ sub-band; child-parent distribution $Py(x_0, x_p)$ in $HL_k$ or $LH_k$ sub-bands; and child parent distribution $Py(x_0, x_p)$ in $HH_k$ sub-band. The model also includes the 1-D distributions $Py(x_0)$. Therefore, two 1-D distributions per wavelet decomposition level k are recorded: 1-D $Py(x_0)$ in $HL_k$ or $LH_k$ sub-bands (similar as per the symmetry assumptions); and 1-D $Py(x_0)$ in $HH_k$ sub-band. These five 2-D histograms and two 1-D histograms are accumulated for each of the five levels of the wavelet decomposition that are used for noise reduction. For the coarsest level of the decomposition, however, the child-parent distribution is not recorded.

For large images, the accumulation may be performed on a tile-by-tile basis. In one implementation, the analysis tile size may be 512×512 pixels. In addition, if multiple images have similar image parameters, the histograms may be integrated over multiple images. Furthermore, one or more parameters may specify whether to get the parameters for the spatial neighbors or the parent neighbor to benchmark performance of the model with smaller neighborhoods. In one implementation, a class SignalStatistics encapsulates such data and may be an array of per-sub-band signal statistics (SubbandSignal-Statitics). Each SubbandSignal Statistics object may contain the five 2-D histograms and the two 1-D histograms for modeling the signal. The noise amplitudes at the various scales of the multi-resolution sub-band decomposition are determined. If there is one or more uniform/smooth areas, or at least a slow-varying area where low-pass information can be easily filtered out, that are sufficiently large for the wavelet decomposition and do not exhibit saturated areas in the spatial domain, the variance $\sigma_n$ is calculated for the sub-band of 3 to 4 first decomposition levels with the robust median estimator:

$$\sigma_n \sim \text{Median}(|y(i,j)|)/0.6745 \quad (21)$$

where wavelet coefficients $y(i,j) \in$ sub-band $HH_0$ and $\sigma_n$ is the standard deviation of the noise distribution. In one implementation, the areas are 128×128 pixels in size. Such an area is declared uniform/smooth if the spatial-domain variance of this area, filtered out of its lowest-pass frequencies in the wavelet domain, is close to the lowest variance found in the spatial domain for smaller size areas (e.g., 32×32 pixels).

The above estimation is performed for several average spatial-domain signal intensities. Then the results are aggregated for increased robustness. If no large uniform/smooth areas can be found, a robust median estimator in the highest-frequency sub-bands of the wavelet transform is used. Since the area is not uniform, the other (coarser) bands may contain valid signal and cannot be used to estimate the noise variance. The other band noise variances are estimated using the noise variance in the highest-frequency sub-band and an independent identically distributed (i.i.d.) additive Gaussian noise model. Under this assumption and knowing the white Gaussian noise variance, it is possible to numerically calculate the noise variance for each coarser sub-band using the wavelet convolution coefficients and the median estimator. For Gaussian distributions:

Variance($a1$*Distribution1+$a2$*Distribution2+...)=$a1^2$*Variance(distribution1)+$a2^2$*Variance(distribution2)+...

Therefore, if an input signal of Gaussian known variance V is decomposed in wavelet sub-bands, each of them has a specific predictable variance. The lowest variance is also estimated on areas that do not contain saturated pixels. Saturated pixels have pixel values greater or equal to the maximum allowed by the sensor. For example, in 8-bit unsigned images saturated pixels have a value of 255. If there are too many saturated pixels, the signal can appear more uniform than it actually is because the saturated area (e.g., at value 255) exhibit no variance and therefore no visible noise.

Like the signal analysis, the noise data may be integrated on a tile-by-tile basis. This could also be extended to multiple images. The noise variance estimations for each wavelet sub-band, using the Gaussian model provides the distribution Pn used in the estimation equation (14).

At 530, the image is transformed back into the image domain.

The speed of the denoising technique may be increased. In particular, the transfer function:

$$x_0'(Y) = \text{MmseEstimationFunction}(y_0,y_1,y_2,y_3,y_4,y_p) \quad (22)$$

can be modeled as follows:

$$\begin{aligned}
\text{MmseEstimationFunction}(y_0, y_1, y_2, y_3, y_4, y_p) = & \quad (23)\\
Estimator1d0(y_0) + Estimator1d1(y_1) + Estimator1d2(y_2) + \\
Estimator1d3(y_3) + Estimator1d4(y_4) + Estumator1dP(y_p) + \\
EstimatorDelta(y_0) * EstimatorBellCurve1d1(y_1) * \\
EstimatorBellCurve1d2(y_2) * EstimatorBellCurve1d3(y_3) * \\
EstimatorBellCurve1d4(y_4) * EstimatorBellCurve1dP(y_p)
\end{aligned}$$

This is based on a simple observation of the general shape to the multivariate function. The multivariate estimator can first be approximated with the 1-D estimator Estimator1d0(y0). A second degree of approximation is achieved by adding the independent contribution of the other neighbors. Finally, there is a typical bell shape near zero that can be modeled with a separable product of 1-D functions.

The procedure includes finding the 1-D estimator function for the neighbor when the reference coefficient is free and all other neighbors are fixed to zero. The function is polished to make sure it is odd. The linear component of the distribution, which is the general slope of the function not containing the S-shaped curve near the origin, is found. The linear component of the distribution is found using simple linear regression, but points that are part of the S-shaped curve near the origin are excluded.

For each neighbor C, the 1-D estimator function is found for neighbor C when the reference coefficient is zero, the neighbor coefficient C is free and all other neighbors are fixed to zero. The 1-D estimator function is polished to make sure it is odd and monotonous. The linear component of the distribution that is the general slope of the function using simple linear regression is found. It is appreciated, that in practice thanks to the symmetries mentioned earlier, the transfer curves are identical for neighbors 1 and 3 (e.g., east and west), as well as for neighbors 2 and 4 (e.g., south and north). The linear component of the estimator may be called Estimator1d#, where # is 1, 2 or P (e.g., parent) depending on if C refers to the horizontal, vertical or inter-band neighbors.

The delta between the 1-D estimator Estimator1d0 previously found and the linear approximation are calculated. The result may be called EstimatorDelta. The value of the reference coefficient $x_m$ is found where the above delta is maximal.

For each neighbor C the 1-D estimation function is found for neighbor C when the reference coefficient is $x_m$, the neighbor coefficient C is free and all other neighbors are fixed to zero. The linear component of the distribution of this function is subtracted. The above function is polished to make sure it is even. The result is a bell-shaped curve that tends to be horizontal near its extremities. The 1-D estimator function for this neighbor C is found when the reference coefficient is $-x_m$, the neighbor coefficient C is free and all other neighbors are fixed to zero. The linear component of the distribution is subtracted for the function. The function is polished to make sure it is even. The result is a bell-shaped curve that tends to be horizontal near its extremities. The above two function which are similar are averaged. The linear prediction for reference coefficient=$x_m$ is subtracted. The result is a bell-shaped curve that tends to be zero and horizontal near its extremities. This "bell-curve" is normalized with respect to the maximal delta between the 1-D estimator Estimator1d( ) and its linear approximation. This maximum delta is the value of the "bell-curve" at the origin. The result is called EstimatorBellCurve1d#, where # is 1, 2, or P (e.g., parent) depending on if C refers to the horizontal, vertical or inter-band neighbors.

The above process has calculated Estimator1d0, Estimator1d1=Estimator1d3, Estimator1d0, Estimator1d2=Estimator1d4, Estimator1dP, EstimatorDelta, EstimatorBellCurve1d1=EstimatorBellCurve1d3, EstimatorBellCurve1d2=EstimatorBellCurve1d4, and EstimatorBellCurve1dP to complete the model.

The advantage of this model is that these twelve 1-D function can be quickly recomputed from the "brute-force" MmseEstimationFunction so that no convolution is needed at render time. In practice, this approximation is invisible when applied to the highest-frequency and also the largest (e.g., most computationally demanding) wavelet sub-bands. In high-quality mode, this approximation may only be used for level 0. In normal mode, the approximation is used up to level 1. In fast mode or in the GPU implementation, this approximation is used up to level 3. The denoising technique using this approximation takes about 0.5-5 seconds for all three channels of a 1024×1024 image on an Athlon 64 type personal computer.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. An image denoising method comprising:
   decomposing an image signal into a wavelet domain using a discrete wavelet transform (DWT), wherein coefficients are grouped in sub-bands of different scales and orientations, including determining wavelet domain noise model and a non-parametric multivariate wavelet-description of an image; and
   determining a noise corrected image in the wavelet domain from the image signal, the wavelet-domain noise model and the non-parametric multivariate wavelet description including Gaussian filtering of probability density function applying a Bayesian multivariate minimum mean square error (MMSE) approximation using two-dimensional marginal projections of each given coefficient, the four nearest neighbors in a same sub-band of the given coefficient and a parent at the same pixel location and orientation in the next coarsest scale.

2. The method according to claim 1, wherein the discrete wavelet transform (DWT) is a Cohen-Daubeschies-Feauveau based discrete wavelet transform.

3. The method according to claim 1, wherein the discrete wavelet transform (DWT) is a convolution-based discrete wavelet transform.

4. The method according to claim 1, further comprising applying the Bayesian multivariate minimum mean square (MMSE) approximation using two-dimensional marginal projections of each given coefficient and the four nearest neighbors for a coarsest scale sub-bands that have no parent.

5. The method according to claim 1, transforming the noise corrected image in the wavelet domain back into a spatial domain using a transfer function including:
   approximating with a one-dimensional estimator of the given wavelet coefficient;
   adding the one-dimensional approximation of an independent contribution of neighbor coefficients; and
   adding the approximation of a separable product of one-dimensional functions.

6. The method according to claim 5, wherein the transfer function includes twelve 1-dimensional functions.

7. One or more non-transitory computing device readable media including instructions which when executed cause a computing device to implement an image denoising method comprising:
   determining a wavelet domain noise model and a non-parametric multivariate wavelet-domain description of a signal probability density function for an image signal; and
   determining a noise corrected image in the wavelet domain from the image signal, wavelet-domain noise model and the non-parametric multivariate wavelet-domain description of the signal probability density function applying a Bayesian multivariate minimum mean square error (MMSE) estimation using two-dimensional marginal projections of each given coefficient, the four nearest neighbors in a same sub-band of the given coefficient and a parent at the same pixel location and orientation in the next coarsest scale.

8. The image denoising method of claim 7, further comprising Gaussian filtering the MMSE estimation.

9. The image denoising method of claim 7, wherein apply the Bayesian multivariate minimum mean square error (MMSE) estimation includes:

calculating the variance of a given area if a spatial-domain variance, of the given area, filtered out of its lowest-pass frequencies, is approximately equal to the lowest variance found in a spatial domain of a corresponding smaller size area; and calculating an independent identically distributed Gaussian noise model with a spatial domain variance equal to a lowest variance of the corresponding smaller size area.

10. The image denoising method of claim 7, further comprising transforming the noise corrected image in the wavelet domain back into a spatial domain using a transfer function including:

approximating with a one-dimensional estimator of a given wavelet coefficient;

adding the one-dimensional approximation of an independent contribution of neighbor coefficients; and adding the approximation of a separable product of one-dimensional functions.

11. One or more non-transitory computing device readable media including instructions which when executed cause a computing device to implement an image denoising system comprising:

a noise analyzer for receiving an image and generating a wavelet domain noise model and a non-parametric, multivariate wavelet-description of the image using a discrete wavelet transform (DWT);

a noise correction engine for receiving the image, the wavelet-domain noise model and the non-parametric, multivariate wavelet description and generating a noise corrected image in the wavelet domain by applying a multivariate minimum mean square error (MMSE) approximation using two-dimensional marginal projections of each given coefficient, the four nearest neighbors in a same sub-band of the given coefficient and a parent at the same pixel location and orientation in the next coarsest scale; and transforming the noise corrected image in the wavelet domain back into the image domain using a transfer function including approximating with a one-dimensional estimator of the given wavelet coefficient, adding the one-dimensional approximation of an independent contribution of neighbor coefficients, and adding the approximation of a separable product of one-dimensional functions.

12. The image denoising system of claim 11, wherein the noise correction engine comprises:

a cache grid effect aligning tiles of the image to a specified grid; and a denoiser render effect for wavelet-domain filter tile aligned to the specified grid.

* * * * *